United States Patent [19]

Gallagher et al.

[11] Patent Number: 4,632,872
[45] Date of Patent: Dec. 30, 1986

[54] RELEASABLE ADHESIVE SHEET MATERIAL

[75] Inventors: Nicholas D. Gallagher; Richard S. Sternasty; Richard A. James, all of Troy, Ohio

[73] Assignee: Kimberly-Clark Corporation, Neenah, Wis.

[21] Appl. No.: 750,827

[22] Filed: Jul. 1, 1985

Related U.S. Application Data

[63] Continuation-in-part of Ser. No. 502,793, Jun. 9, 1983, abandoned.

[51] Int. Cl.$^4$ ................................................ C09J 7/02
[52] U.S. Cl. .................................... 428/350; 428/352; 428/906; 156/289
[58] Field of Search ................. 428/346, 347, 350, 41, 428/42, 906, 352; 156/289, 23

[56] References Cited

U.S. PATENT DOCUMENTS

| | | | |
|---|---|---|---|
| 2,848,105 | 8/1958 | Bartell et al. | 428/346 |
| 3,076,588 | 2/1963 | Conway et al. | |
| 3,425,968 | 2/1969 | Reiling | |
| 3,531,316 | 9/1970 | Sternasty | |
| 4,258,092 | 3/1981 | Labor | 428/906 |
| 4,304,815 | 12/1981 | Cugasi | 428/352 |
| 4,398,985 | 8/1983 | Eagon | 156/233 |

*Primary Examiner*—Edith Buffalow
*Attorney, Agent, or Firm*—William D. Herrick

[57] ABSTRACT

Adhesive coated sheet material particularly adapted for self-releasable adhesive tapes, labels, novelty stickers or the like. The invention comprises the use of a coated fibrous substrate in combination with a water moistenable, heat activated or solvent activated coating wherein the adhesive coating is applied against a coated side of the substrate. The result is an adhesive sheet material that, when bonded to itself by applying the adhesive against the opposite side, may be readily peeled apart by delamination of the coating on the base sheet. This combination provides a highly effective yet very economical bander for coiled materials such as rolls of stamps, or for stacks of currency, and the like. Preferred embodiments include the use of a clay coated Kraft stock base web in combination with a water moistenable adhesive formulation. This provides excellent bonding results and delamination with the base sheet essentially intact. Other embodiments include the use of heat activated or solvent activated adhesives, as well as the use of other base sheets such as latex saturated webs and nonwoven base sheets, for example. In each case the coating for the base sheet and the adhesive are selected from combinations wherein the coating has a greater affinity for the adhesive than for the base web, at least in substantial part, to provide the desired delamination. The benefits will be obtained in the construction where the adhesive is applied to a coated side of the base web and also where the adhesive is applied to the opposite side but, in use, contacts the coated side. It is also important that the base sheet stock have sufficient strength properties for the intended use.

12 Claims, 6 Drawing Figures

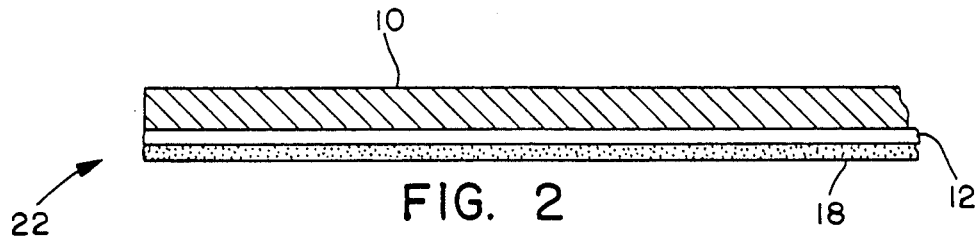
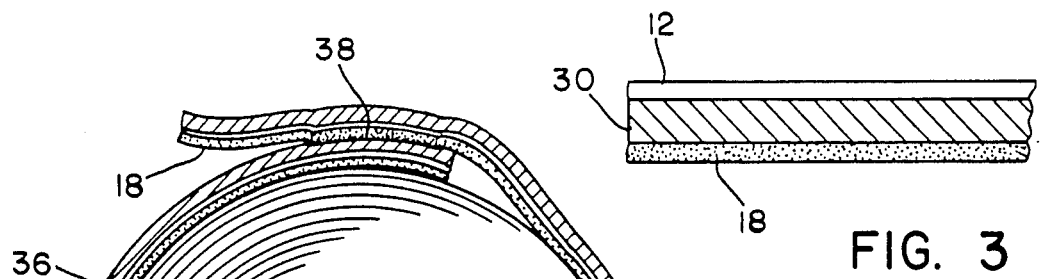
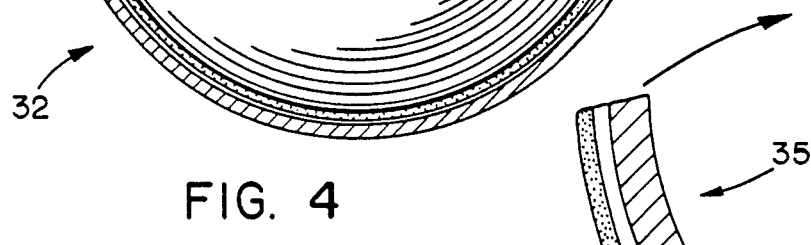
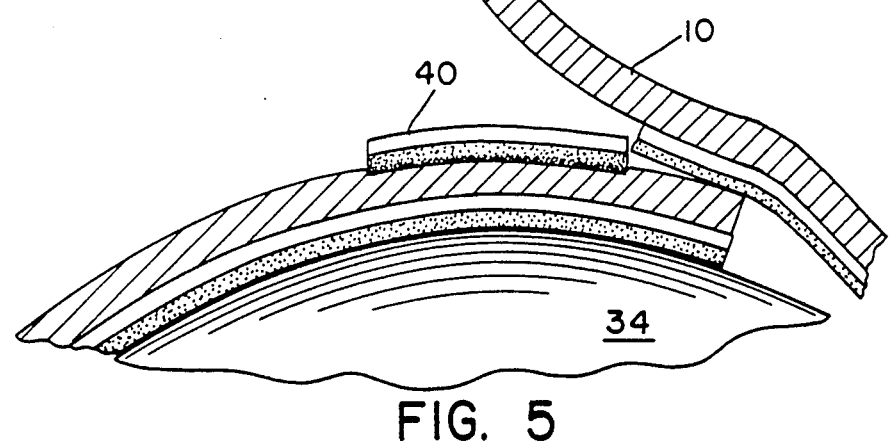

RELEASABLE ADHESIVE SHEET MATERIAL

This application is a CIP of application Ser. No. 502,793 filed June 9, 1983, now abandoned.

BACKGROUND OF THE INVENTION

1. Field of the Invention

The present invention is directed to adhesive coated sheet materials and especially those in the form of tapes, strips, lables or the like. In particular, the invention is directed to such of those sheet materials as are intended generally for one-time use wherein they are bonded to themselves by contact between the adhesive surface and the opposite surface or back side or for multiple use as, for example, novelty stickers. Such adhesive coated sheet materials are well known, and provide means for restraining coiled, stacked or gathered items. Familiar examples include tape seal closures for rolls of postage stamps, banders for stacks of currency, skeins of yarn or shoestrings and the like. Due to the high value of many of these items, it is extremely important that the adhesive aggressively maintain the closure. On the other hand, the single use of such strips demands a cost consistent with disposability.

2. Description of the Prior Art

Published patents and literature descriptions of adhesive coated sheet materials are legion. It is also well known to use adhesive coated strips for the specific application of banding rolls of stamps, stacks of currency and the like. As above stated, this application demands a delicate balance between the strength and tack properties required to prevent premature release and the cost of the banders, themselves. The use of strps of conventional masking tape or a tape comprised of an uncoated Kraft base sheet having a conventional gum coating applied thereto have both proven unsatisfactory because the aggressive nature of the adhesive frequently resulted in the tape base sheet, itself, undesirably tearing or delaminating all around the strip, thus leaving the contents still banded. Attepts to modify such materials by providing selective coating of the adhesive to reduce the peel strength have proven costly. Other attempts to reduce the bonding by applying release coating to the back side have also been expensive. The use of an adhesive with less tack or bond strength is subject to premature adhesive failure. An alternative approach has been to increase the integrity of the base sheet to prevent delamination, but such stronger base sheets also increase costs and nonwoven base sheets require specially formulated adhesives or extended drying times. To merely illustrate this discussion of prior art adhesive coated materials, the following patents may be identified: U.S. Pat. No. 3,425,968 to Reiling date 4 Feb. 1969 directed to non-curling gummed products, U.S. Pat. No. 4,377,433 to Merz et al. dated 22 Mar. 1983, U.S. Pat. No. 2,978,343 to Russo et al. dated 4 Apr. 1961, U.S. Pat. No. 3,574,153 to Sirota dated 6 Apr. 1971, and U.S. Pat. No. 4,192,783 to Bomball et al. dated 11 Mar. 1980. These patents and conventional practice, however, reflect a standard procedure of applying the adhesive coating to uncoated base stock or to the uncoated side of coated base stock, thus leaving the coated side free for accepting printing. Both structures fail to satisfy the adhesive property requirements with ready release. U.S. Pat. No. 3,976,588 to Conway et al. dated 5 Feb. 1963 is directed to an adhesive construction requiring a smooth, film layer component.

SUMMARY

The present invention provides a unique and cost effective adhesive coated sheet material particularly adapted for the bander and other applications above described. In accordance with the invention, it has been found that by selection of a particular coated base sheet web and applying the adhesive coating to a coated side of the base web or otherwise so that in use it will contact the coating, the resulting combination, while aggresively bonded upon contact between the adhesive coated side and the opposite side and activation of the adhesive, may be readily separated without delamination of the base sheet web, itself. Rather, the coating remains with the adhesive and separates from the base sheet web and releases the banded contents. In this manner, use may be made of conventionally available water moistenable, solvent activated, or heat sensitive adhesives as well as readily available coated webs as the base sheet. In contrast to prior attempts, however, it is not necessary to utilize separate release coatings or resort to selective adhesive application. Also contrary to conventional practice, the application of the adhesive to the coated side of the base sheet is preferred to achieve the benefits described. Examples of preferred embodiments include a clay coated Kraft stock base sheet to which is applied on the coated side a water moistenable adhesive formulation. Others include the use of a coated latex saturated base sheet or a coated Kraft base sheet as well as other conventional coated base sheets such as 60 lbs./3300 ft$^2$ coated litho webs. In use as a bander, the strips of the present invention produce a strong seal since an aggressive adhesive may be used in combination with a smooth backing and yet are readily and quickly releasable when desired. In general, the peel strength under such conditions will be at least in the range of about 0.01 to 10.0 lbs./inch width and, preferably, 0.2 to 3.0 lbs./inch width. The coating will have an affinity for the adhesive that is greater than its affinity for the base sheet web or itself as measured by microscopic examination of separated bands in the previously bonded area. The clay coating originally on the stock will be found predominantly adhered on the surface of the adhesive. A useful independent measure with moistenable adhesives involves moistening the adhesive coat on a one-inch strip and bonding it to a 99 lbs./3300 ft$^2$ Kraft paper. After drying for $\frac{1}{2}$ to 1 minute, the strip is slowly hand peeled from the paper at an angle of about 120° at a rate of about 20 inches/minute. Useful materials will exhibit a substantial amount of clay coating deposited on the surface of the adhesive layer on the paper.

BRIEF DESCRIPTION OF THE DRAWINGS

FIG. 2 illustrates, in cross section, one form of the improved releasable adhesive sheet of the invention;

FIG. 3 illustrates a similar view of a second form of the releasable adhesive sheet material of the present invention;

FIG. 4 illustrates the adhesive sheet material of the present invention illustrated in FIG. 2 in use as a bander;

FIG. 5 illustrates the bander of FIG. 4 peeled away with certain portions greatly exaggerated for clarity.

DESCRIPTION OF THE PREFERRED EMBODIMENTS

Figure 1:
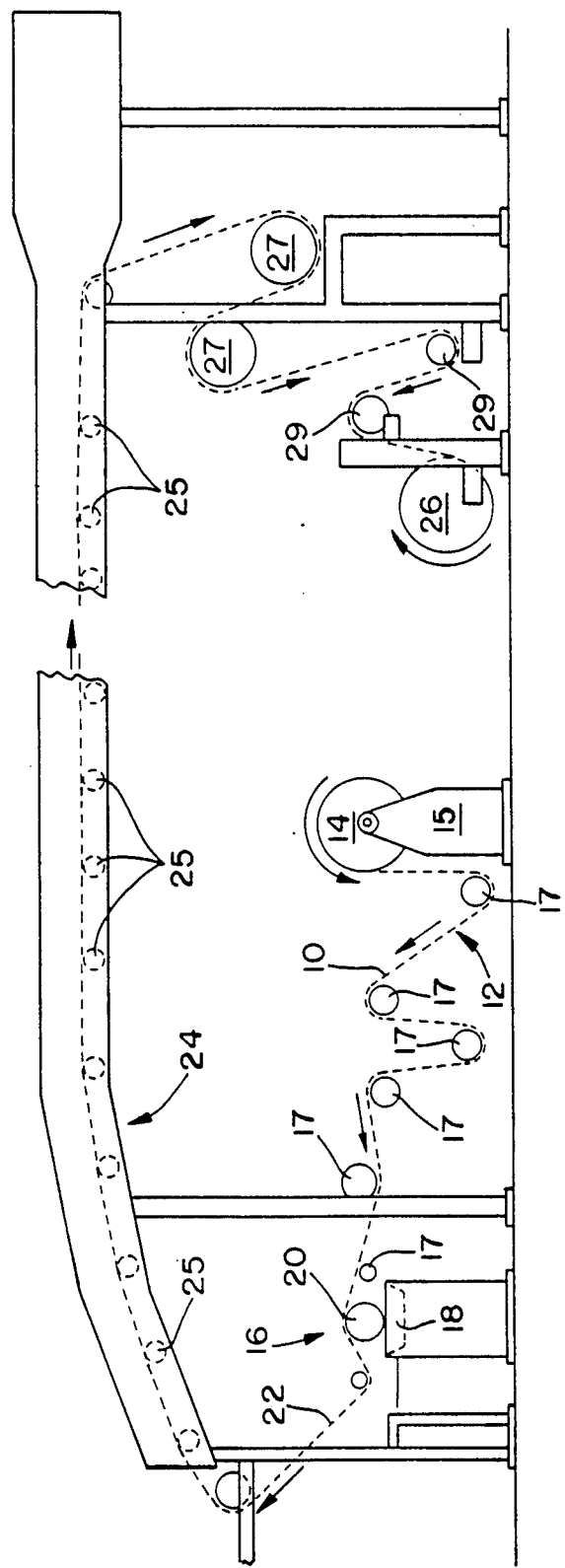
FIG. 1 illustrates in schematic form one process for producing an improved releasable adhesive sheet of the present invention.

While the invention will be described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims.

In accordance with the present invention, the base sheet material may be selected from a wide variety of available coated webs. These webs include those that have been previously employed as adhesive backings by applying the adhesive coating to the uncoated side. While not wishing to limit the present invention to specific base materials, examples include clay coated bleached Kraft stock (35–60 lbs./3300 ft$^2$) such as is available from Watervliet Paper Company, smudge-proof coated latex saturated sheet as is available from Kimberly-Clark Corporation under the designation Munising Division Grade C-32714, and treated synthetic nonwoven webs such as spunbonded polyolefin as is available from duPont under the trademark Tyvek$^2$designation 1073D. Other base web materials will suggest themselves to those skilled in the art. It is only essential that the base web material have a coating or a treatment resulting in the fibers or at least one side of the web having a substantially continuous film formed thereon on at least one side thereof. Such coatings or treatments as are contemplated are those which are normally employed for improved printability, generally clay and other pigment coatings. These are low cost coatings and may be applied directly on the paper making machine or as an off machine coating step. For most purposes, a clay coating of about 10 to 25 lbs./3300 ft.$^2$ will be suitable for purposes of the present invention while falling within the range of commercial paper production. Examples of other coatings or treatments which may be used include sizing or holdout coatings conventionally employed to reduce requirements for subsequent print or other coatings as well as antistatic and others which form a coating on the web or fibers.

Any of a wide variety of adhesives may be employed in the present invention. These include, without limitation, water moistenable adhesives such as are described in the above mentioned U.S. Pat. No. 3,425,968 to Reiling dated 4 Feb. 1969, for example, heat seal coatings such as are taught in U.S. Pat. No. 2,625,287 to Holt, Jr., et al. dated 13 Jan. 1953 and solvent activatable adhesive coatings such as are described in U.S. Pat. No. 3,531,316 to Sternasty dated 29 Sept. 1970. Selection of a particular coating for the purposes of the present invention will depend upon the desired end use as well as the nature of the coated base sheet web. The determining factors will be the compatibility of the base web sheet and the adhesive; for example, the adhesive must not unduly deteriorate the base web sheet nor can the coating of the base web sheet interfere unduly with the adhesive action of the adhesive composition. A second important factor will be the degree of bonding obtained when the adhesive side is placed in contact with the opposite side and the adhesive activated by solvent, water, heat, or the like, the requirement being that the coating bond more aggressively to the adhesive than to its web substrate or to itself such that the coating will delaminate when peel stress is applied. This may be readily determined by weighing samples before and after peeling and comparing the amount of coating adhering after peeling and comparing the amount of coating adhering to the peeled components. Examples of adhesives which may be used include water moistenable adhesives as described in the above mentioned U.S. Pat. No. 3,425,968 to Reiling dated 4 Feb. 1969, heat seal adhesives based on homopolymers or copolymers of ethylene and vinyl acetate and solvent activatable adhesives based on elastomers containing acrylonitrle or choloroprene. The amount of adhesive required will also depend upon the nature of the base web and the desired end use. In general, the amount will be sufficient to provide a peel strength of at least about 0.01 to 10 lbs./inch width, and preferably about 0.2 to 3.0 lbs./inch width. For example, for the application as a bander for coiled stamps and using a base sheet of a 62 lbs./3300 ft$^2$ latex saturated paper web having one side clay coated, the amount of dry gum water moistenable adhesive will be generally in the range of from about 6 to 14 lbs./3300 ft.$^2$, and preferably about 10 to 12 lbs./3300 ft.$^2$.

Turning to FIG. 1, a method for preparing a preferred embodiment of the invention will be described. As shown, base sheet 10 having coated side 12 is unwound from roll 14 supported by stand 15 and directed over idler and guide rolls 17 to adhesive coating station 16 where adhesive 18 is applied by means of roll 20 or other suitable means such as a rod, blade, or the like. The adhesive coated sheet 22 is then dried by passing through forced air dryer 24 over guide rolls 25, cooled and rewound by means of chilled rolls 27 or the like into roll 26 over idler rolls 29. The resultant stock may be slit into desired widths by slitting, wound into rolls or sheeted as desired. Various equipment support means required (only partially illustrated) will be apparent to those skilled in this art.

Turning to FIG. 2, coated sheet 22 is shown in cross-section. As illustrated, it shows the combination of base sheet 10 with adhesive 18 applied to the coating 12 on one side thereof.

Turning to FIG. 3, a similar view is shown wherein a different base sheet 30 is employed and the coating and adhesive are on opposite sides.

Turning to FIGS. 4 and 5, the adhesive sheet of the invention in tape form is illustrated in cross-section as a bander for a coil of postage stamps. As shown, tape 32 encircles stamp coil 34 and is bonded to itself by means of contact between activated adhesive 18 and the opposite side 36 at overlap area 38. Thus, stamp coil 34 is retained in a compact, rolled condition. As shown in FIG. 5, when it is desired to open the coil of stamps, the adhesive tab 35 is pulled away, and coating 40 delaminates as shown in exaggerated detail. Thus, the stamp package may be conveniently and quickly opened without premature tearing and without delamination of bander web 10.

Figure 6:
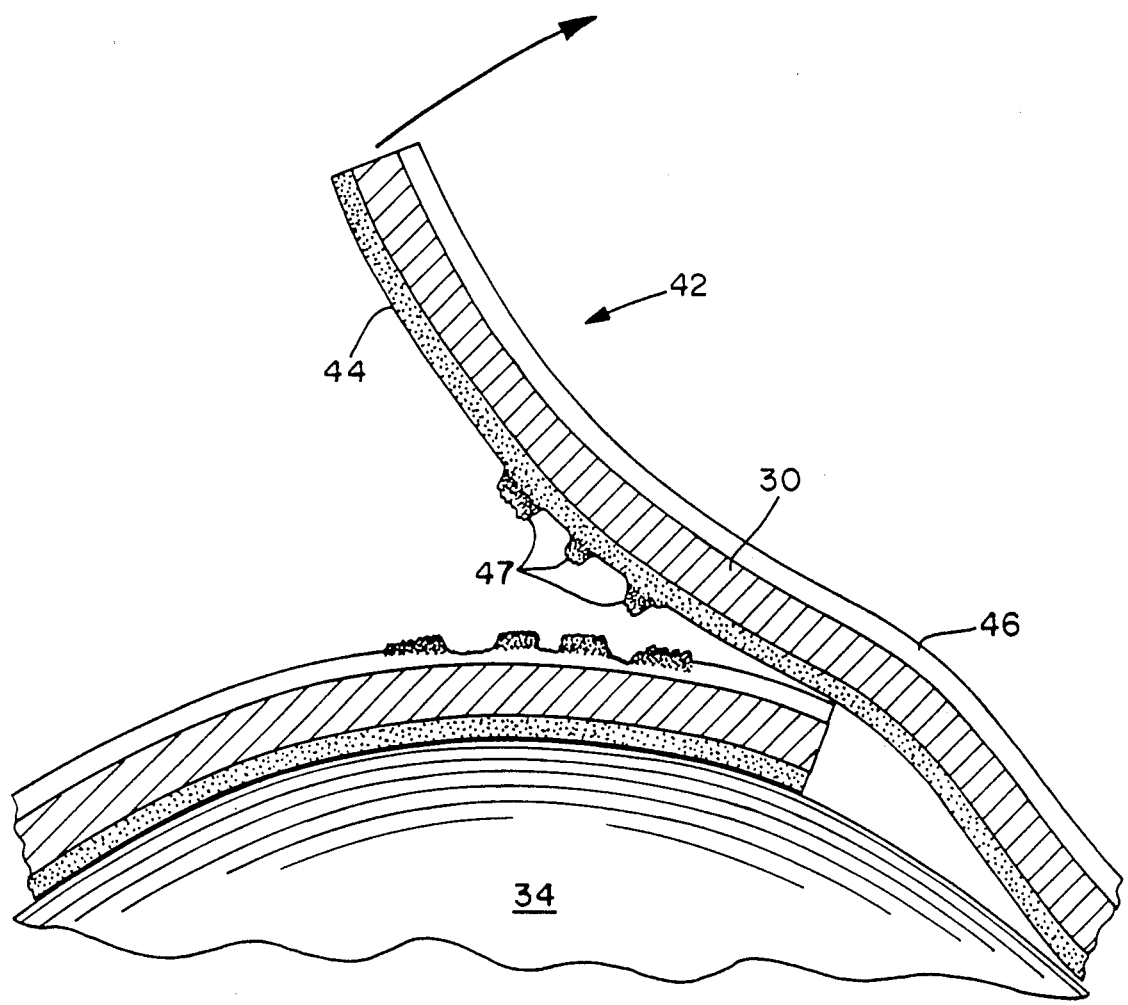
FIG. 6 is an enlarged view similar to that of FIG. 5 showing the embodiment of FIG. 3.

Turning to FIG. 6, there is shown an enlarged and exaggerated cross-sectional view of the embodiment of FIG. 3 in use. In this case, bander 42 comprises base sheet 30 having adhesive 44 on one side and a surface sizing 46 on the other. Such a composite may utilize webs as disclosed in Louden U.S. Pat. No. 4,058,648 dated 15 Nov. 1977, for example. As shown in FIG. 6, in use, the adhesive layer 44 will contact sizing 46. When peeled away, although the sizing 46 may not totally and cleanly adhere to adhesive layer 44, the preferential adhesion is sufficient to result in pulling away at areas 47 and opening the band without delamination of base sheet 30.

EXAMPLES

Example 1

Using the process described with respect to FIG. 1, a 77 lb. per 3300 sq. ft. Kraft stock coated with about 15 lbs./3300 ft.$^2$ of a clay coating (the composite being available from Watervliet Paper Co. under designation "Envelope Kraft-coated one side") was coated on the clay coated side with about 10 lbs. per 3300 sq. ft. of a water moistenable adhesive formulation dispersed in a water-organic solvent system of the type described in the above mentioned Reiling U.S. Pat. No. 3,425,968 dated 4 Feb. 1969 and offered commercially by Kimberly-Clark Corporation as the adhesive on its Pancake$^3$ dry gum label and business form paper. The coated web was then dried free of solvent, the adhesive coating moistened with water over a 1 in.$^2$ area and the web bonded to its reverse side. Quick tack ranged about 23 sec. This was determined by separating the moistened stock immediately after application to its reverse side. Separation was obtained by hand pulling at an angle of about 120° and a rate of about 20 in./min. The end point was defined as the time at which coating separation occurred.

After aging for 24 hours, the shear bond strength of the construction prepared was greater than the tensile strength of the stock (about 30–38 lbs./in. width), however, the bond readily separated as desired upon application of a peel force of about 0.27 to 0.78 lb./inch width with the stock remaining essentailly intact. This and other data contained in the Examples were obtained using an Instron Model 1130 tester with a jaw separation speed of 12 in./min.

Example 2

Example 1 was repeated with a base sheet of 62 lbs. per 3300 sq. ft. of a clay coated latex saturated sheet (available from Kimberly-Clark Corporation under the designation Munising Grade C-32714), and the result was a shear bond strength exceeding the tensile strength of the base stock (about 29 to 37 lbs./in. width) and a web band that was also readily separated when a peel force of about 0.35 to 0.65 lb./in. width was applied. The quick tack results were 90 to 120 sec.

Example 3

Example 1 was repeated using a 112 lb./3300 ft.$^2$ latex saturated base sheet with a clay coating on both sides (available from Kimberly-Clark Corporation under designation Munising Grade M-31415). The result was a shear bond strength exceeding the tensile strength of the stock (about 42 to 49 lbs./inch width). The bond, however, was readily separated when a peel force of about 0.6 to 1.1 lb./inch width was applied. The quick tack of this construction was about 300 sec.

Example 4

Example 1 was repeated using a base sheet of 47 lbs. per 3300 sq. ft. of a densified Kraft coated with 8 lbs./3300 ft.$^2$ of polyvinyl alcohol resin (Gelva grade 20–30 from Monsanto) applied by Meyer rod from a 72% aqueous methanol mixture. For this Example, the moistenable adhesive was applied to the side opposite the polyvinyl alcohol resin coating. In this case, the shear bond strength of the construction was about 7.5 lbs./inch width and the bond readily separated by applying a peel force of about 0.04 to 0.14 lbs./inch width.

Example 5

The base stock of Example 2 was coated on the clay coated side with 12 lbs./3300 ft$^2$ of a blend of polymers and copolymers of ethylene and vinyl acetate (offered by Kimberly-Clark Corporation, Brown-Bridge Division on coated stock as adhesive 808-PP). The coated web was dried free of water and the adhesive activated at 320° F. for 5 seconds with a heating iron applied over a 1 in.$^2$ area in contact with the reverse side. After 24 hours, the shear bond strength exceeded the tensile strength of the stock (about 26 to 32 lbs./inch width). However, the bond readily separated as desired upon application of a peel force of about 0.45 to 0.8 lb./inch width with the stock remaining essentially intact.

Example 6

The base stock of Example 2 was coated on the clay coated side with about 12 lbs./3300 ft.$^2$ of a blend of styrene and acrylic ester polymers and copolymers applied from a water dispersion (offered by Kimberly-Clark Corporation, Brown-Bridge Division on coated stock as adhesive SA-354). The coated stock was dried free of water, and the adhesive activated over a 1 in.$^2$ area by treating with toluene and bonded to its reverse side. After 24 hours, the shear bond strength was between 14 and 32 lbs./inch width. However, the bond readily separated as desired upon application of a peel force of about 0.1 to 0.3 lb./inch width with the stock essentially intact. The quick tack after solvent activation with toluene, averaged 150 sec.

For comparison, two samples of coiled stamps obtained from a U.S. Post Office banded by a web of 38.5 lbs./3300 ft$^2$ bleached Kraft coated with 16 lbs./3300 ft.$^2$ of a vegetable based water moistenable adhesive were also tested. These bands had a shear bond strength in excess of the tensile strength of the paper (about 20 to 23 lbs./inch width) and both delaminated within the base web, itself, upon hand peeling by grasping the finger tab, thus hindering unwrapping of the coil stamps. The same result occurred upon mechanical testing of laboratory prepared samples using a peel force of 0.25 to 0.45 lb./inch width.

Example 7

This example demonstrates the adhesive sheet of the invention particularly as may be adapted for use in making removable adhesive information bearing items such as lables, novelty stickers, decals or the like.

Using the process described with respect to FIG. 1, a 44 lb. per 3300 sq. ft. bleached Kraft stock coated with about 11 lbs./3300 ft.$^2$ of a clay coating (the composite being available from Watervliet Paper Company under designation "Brown-Bridge P.O. No. 21853") was coated on the clay coated side with about 10 lbs. per 3300 ft.$^2$ of a water moistenable adhesive formulation dispersed in a water-organic solvent system of the type and as described in Example 1.

A one inch wide strip of the resulting design was moistened on the adhesive coating with water and applied to various paper substrates other than itself, including 275 lb. test corrugated, 99 lb./3300 ft.$^2$ natural Kraft, 60 lb./3300 ft.$^2$ ClS Litho, 60 lb./3300 ft.$^2$ Kromekote (Champion International), 55 lb./3300 ft.$^2$ English Finish, 8 point coated and uncoated tag. Quick tack ranged between 25 and 72 seconds on the various substrates involved. This was determined by separating the moistened stock immediately after application to the selected substrates. Separation was obtained by hand pulling at an angle of about 120° and at a rate of about 20 in./min. The end point was defined as the time at which fiber tear in substrate or clay coating separation occurred.

After aging for 24 hours, the peel force of the design to the selected substrates averaged between 0.45 and 0.61 lb./inch width with the stock remaining essentially intact. This data was determined using an Instron Model 1130 tester with a jaw separation speed of 12 in./min and a separatio angle of 90°.

The resulting product in the form of a novelty sticker was easily attached after moistening to the substrates and subsequently easily removed leaving an area to which another sticker could be applied.

While the invention has been demonstrated with respect to specific adhesives, it will be apparent that by following the criteria defined above, suitable adhesive coated sheets in accordance with the invention may be made with other types of adhesives as well.

Thus, it is apparent that there has been provided, in accordance with the invention, a releasable adhesive sheet material that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A self-adherent, nondelaminating adhesive sheet material consisting essentially of,
    (a) a fibrous base web, having a first side and an opposite side,
    (b) a first coating on said first side of said base web forming a substantially continuous coating, and
    (c) an adhesive coating on said coated base web covering and in contact with said first coating at all times or located on said opposite side but in either location positioned so as to be in contact with said first coating at least where said adhesive sheet material is placed in overlapping contact with itself, wherein said first coating has a greater affinity for said adhesive than for said base web, whereby when opposite surfaces of said adhesive sheet material are placed in overlapping contact with each other, said first coating predominately adheres to said adhesive, and the surfaces separate upon application of peel force without substantially delaminating said base web.

2. The sheet material of claim 1 wherein the adhesive layer is on said first coated side of said base web.

3. The sheet material of claims 1 or 2 wherein the shear bond strength between the adhesive and said first side is at least about five pounds per inch width and the peel strength is in the range of from about 0.01 to 1.0 pounds per inch width.

4. The adhesive sheet material of claims 1 or 2 wherein the adhesive is a water moistenable adhesive applied to said first coating.

5. The adhesive sheet material of claims 1 or 2 wherein the adhesive is a heat sealable adhesive.

6. The adhesive sheet material of claims 1 or 2 wherein the adhesive is a solvent activable adhesive.

7. The adhesive sheet material of claims 1 or 2 wherein the base web is clay coated paper.

8. The adhesive sheet material of claims 1 or 2 wherein the base web is a latex saturated sheet.

9. The adhesive sheet material of claims 1 or 2 wherein the base web is a nonwoven sheet material.

10. The adhesive sheet material of claims 1 or 2 in the form of a coil bander.

11. The adhesive sheet material of claim 1 or 2 in the form of an information bearing item.

12. The adhesive sheet material of claims 1 or 2 in the form of a novelty sticker.

* * * * *